(12) United States Patent
Wangensteen et al.

(10) Patent No.: US 12,111,438 B2
(45) Date of Patent: Oct. 8, 2024

(54) REPEATING A PREVIOUS MARINE SEISMIC SURVEY WITH A SUBSEQUENT SURVEY THAT EMPLOYS A DIFFERENT NUMBER OF SOURCES

(71) Applicant: PGS GEOPHYSICAL AS, Oslo (NO)

(72) Inventors: Magnus Wangensteen, Levanger (NO); Christian Strand, Finchampstead (GB); Bertrand Caselitz, Weybridge (GB); Edwin Hodges, Guildford (GB); Didier Lecerf, Guildford (GB)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 18/130,751

(22) Filed: Apr. 4, 2023

(65) Prior Publication Data

US 2023/0236332 A1    Jul. 27, 2023

Related U.S. Application Data

(62) Division of application No. 17/189,128, filed on Mar. 1, 2021, now Pat. No. 11,662,491.

(60) Provisional application No. 63/082,419, filed on Sep. 23, 2020.

(51) Int. Cl.
*G01V 1/30* (2006.01)
*G01V 1/38* (2006.01)

(52) U.S. Cl.
CPC ............... *G01V 1/308* (2013.01); *G01V 1/38* (2013.01); *G01V 2210/1212* (2013.01); *G01V 2210/612* (2013.01)

(58) Field of Classification Search
None
See application file for complete search history.

(56) References Cited

U.S. PATENT DOCUMENTS

| | | | |
|---|---|---|---|
| 2018/0001977 | A1 | 1/2018 | Toennessen |
| 2019/0120988 | A1 | 4/2019 | O'Dowd |
| 2020/0047856 | A1 | 2/2020 | Toennessen |

FOREIGN PATENT DOCUMENTS

| | | |
|---|---|---|
| EP | 2 728 384 A2 | 5/2014 |
| GB | 2554131 A | 3/2018 |
| GB | 2587867 A | 4/2021 |

OTHER PUBLICATIONS

GB Search Report from Application No. GB2113234.5, mailed Mar. 11, 2022, 3 pages.
Wallace, "Multiple Source Acquisition for Use in 4D Marine Seismic," First Break, vol. 36 (Nov. 2018).

*Primary Examiner* — Lina Cordero

(57) ABSTRACT

Methods and apparatus are described for performing a 4D monitor marine seismic survey that repeats a previous survey. A number of sources may be used during the 4D monitor survey that differs from a number of sources that were used during the previous survey. Shot points from the previous survey are repeated by the 4D monitor survey, and additional shot points may be produced during the 4D monitor survey that were not produced during the previous survey. Embodiments enable efficiency and data quality improvements to be captured during 4D survey processes, while preserving repeatability.

12 Claims, 12 Drawing Sheets

REPEATING A PREVIOUS MARINE SEISMIC SURVEY WITH A SUBSEQUENT SURVEY THAT EMPLOYS A DIFFERENT NUMBER OF SOURCES

CROSS-REFERENCE TO RELATED APPLICATIONS

This application is a divisional of, and claims benefit to the filing date of, U.S. Non-Provisional application Ser. No. 17/189,128, filed 2021 Mar. 1, which itself claims benefit to the filing date of U.S. Provisional Application 63/082,419, filed 2020 Sep. 23. The contents of both prior applications are hereby incorporated by reference as if entirely set forth herein. In the event of a conflict between the meaning of terms used herein and the same or similar terms as used in the prior applications, the terms and meanings provided herein shall control.

BACKGROUND

Marine seismic surveys are often used to improve the quality of decisions associated with locating or producing natural resources, such as hydrocarbons, in a geographic area of interest.

It is sometimes the case that multiple marine seismic surveys are performed over the same geographic area at different times. For example, a first survey may be performed over a given area either before or immediately after a production field is established to extract hydrocarbons from that area. Later, after production has begun, one or more subsequent surveys may be performed over the same area in order to detect changes in subsurface structures or characteristics over time. Information about changes in the subsurface can be used to improve efficiency in hydrocarbon extraction from the field.

The process of performing multiple surveys over the same area at different times for this purpose is often referred to as "4D" surveying. Each of the surveys performed during the process is a 3D survey (giving information in three spatial dimensions) and comprises a temporal snapshot of the subsurface. The term "4D" refers to the fourth dimension of time, as the comparison of results from the various 3D surveys gives information about changes in the subsurface as time advances. The first survey in a 4D surveying process is often referred to as the "baseline" survey. Subsequent surveys are often referred to as "monitor" surveys. Thus, a baseline survey is always a previous survey relative to any monitor survey, and a given monitor survey may be a previous survey relative to a subsequently performed monitor survey. The terms "baseline" and "previous" are used interchangeably herein.

One of the goals in 4D surveying is to ensure that a comparison of results from the baseline and monitor surveys, or between different monitor surveys, will yield meaningful information. Conventionally, therefore, industry participants have endeavored to perform monitor surveys using the same source and streamer layouts as were used during the baseline survey. This is so that changes observed in monitor survey results are more likely to reflect changes in the subsurface than they are to reflect changes in the surveying methods employed during the surveys themselves. In this sense, a 4D monitor survey attempts to repeat a previous baseline survey. The degree to which this is achieved is often referred to as "repeatability" and can be measured as the sum of the differences in source positions, dS, and the differences in receiver positions, dR, between a monitor survey and a previous survey. The lower the sum, dS+dR, the better the repeatability achieved by the monitor survey.

Other goals in marine surveying, however, include efficiency and data quality. As surveying methods and equipment advance in sophistication over time, these goals can come into conflict with the goal of repeatability in the context of 4D surveying. This is because adopting new surveying techniques or equipment requires deviating from the techniques and equipment that were employed during the baseline survey. Doing so has been thought to undermine repeatability.

Embodiments described herein enable efficiency and data quality improvements to be captured during 4D survey processes while preserving repeatability.

DETAILED DESCRIPTION

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Figure 1:
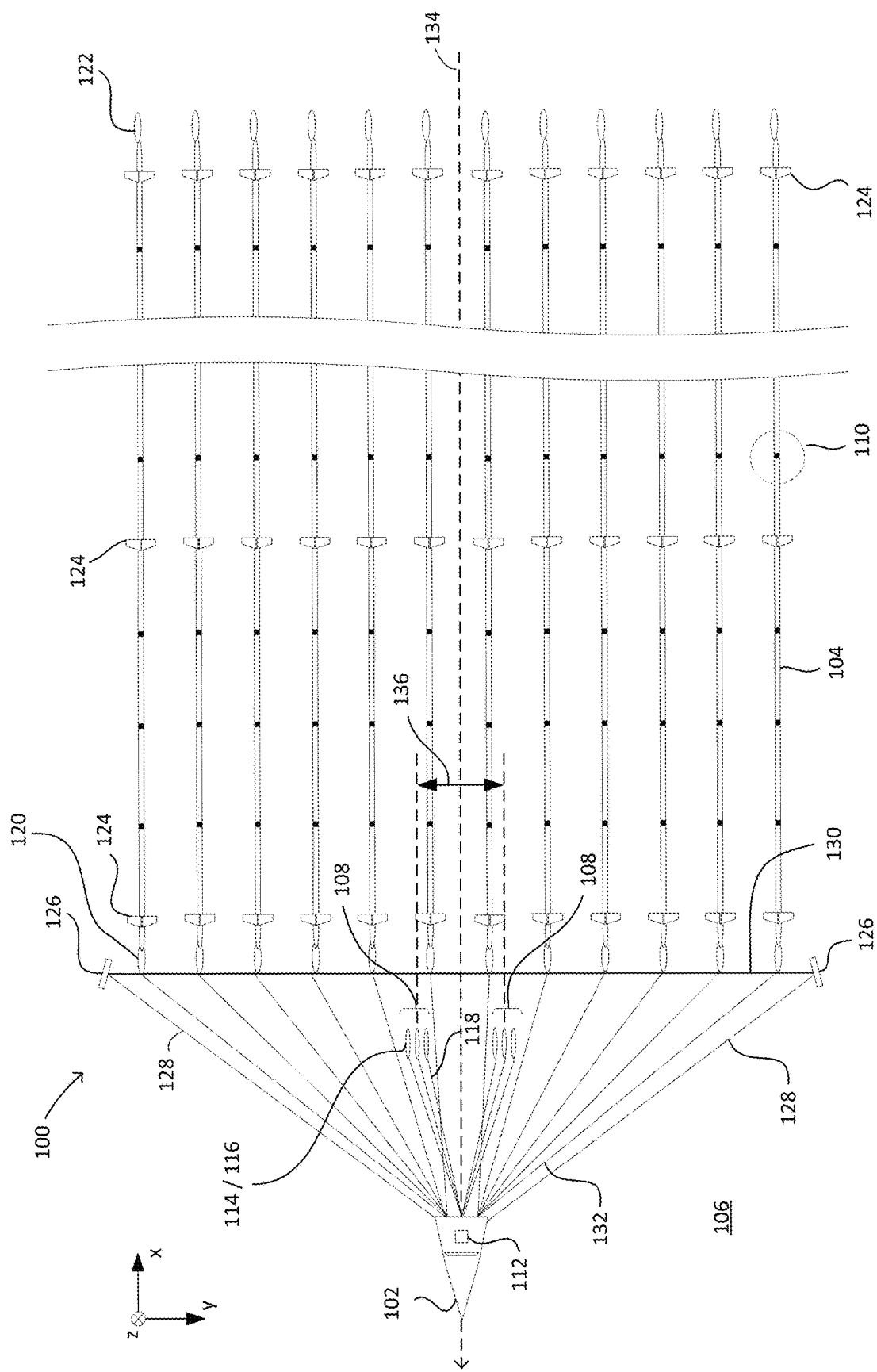
FIG. 1 is an overhead view illustrating a representative towed streamer marine seismic survey system.
Figure 2:
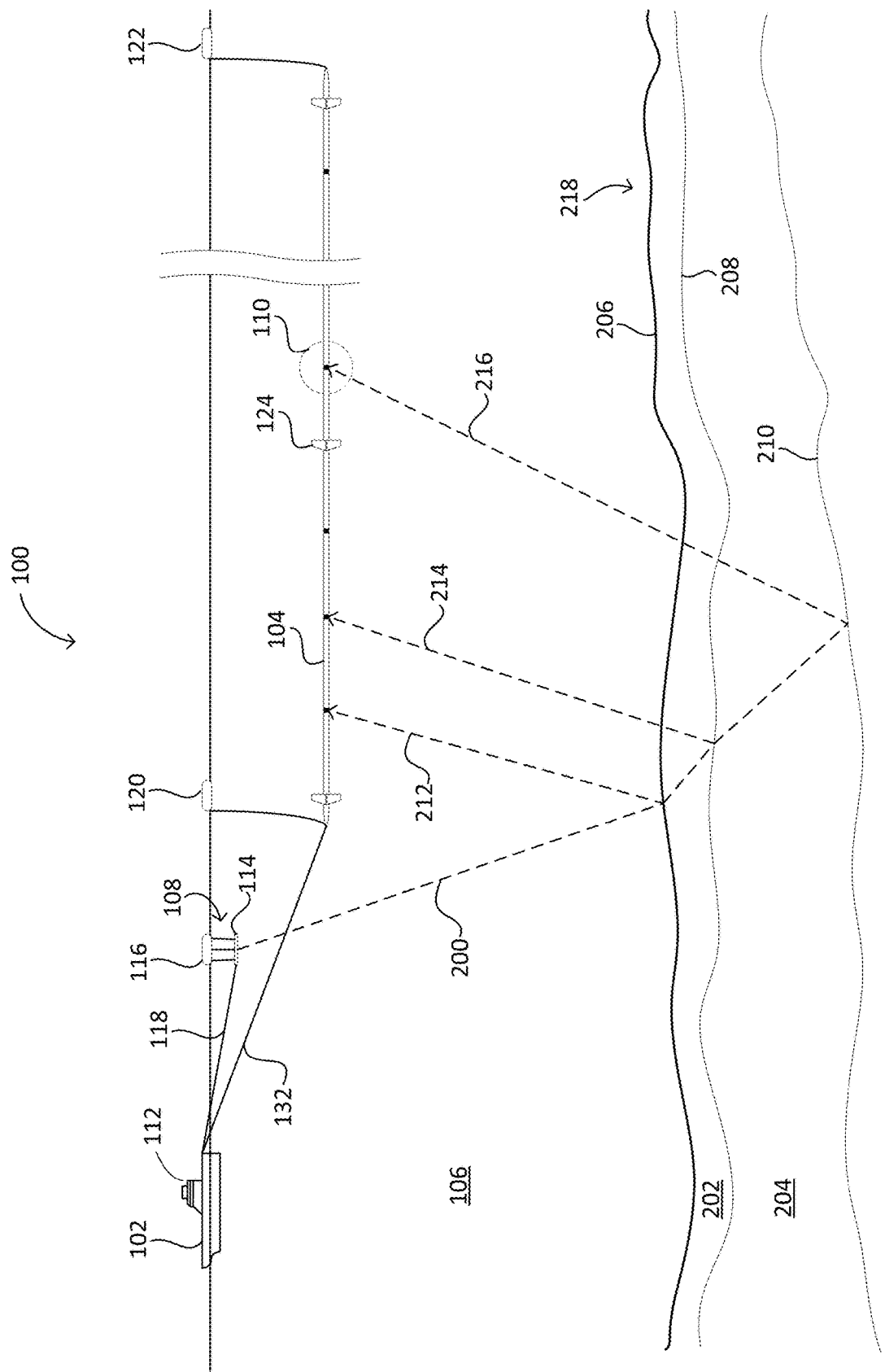
FIG. 2 is a side elevation view of the marine seismic survey system of FIG. 1.

FIGS. 1 and 2 present top and side elevation views, respectively, of an example towed-streamer marine seismic survey system 100. Survey system 100 is representative of a variety of similar geophysical survey systems in which a vessel 102 tows an array of elongate sensor streamers 104 in a body of water 106 such as an ocean, a sea, a bay, or a large lake. Vessel 102 is shown towing twelve streamers 104 in the illustrated example. In other embodiments, any number of streamers may be towed, from as few as one streamer to as many as twenty or more. Embodiments to be described below have useful application in relation to towed-streamer surveys such as that depicted in FIGS. 1 and 2. They may also have useful application in other environments in which different types of seismic sensors are used. For example, they may be employed in environments in which the seismic sensors are housed in ocean bottom cables or in ocean bottom nodes.

During a typical marine seismic survey, one or more seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218.

In the illustrated example, vessel 102 is shown towing a total of two sources 108. In other systems such as those to be described below, different numbers of sources may be used, and the sources may be towed by other vessels, which vessels may or may not tow streamer arrays. Typically, a source 108 includes one or more source subarrays 114, and each subarray 114 includes one or more acoustic emitters such as air guns or marine vibrators. A distinction between a "source" as used herein and a source subarray is that the crossline distance between two or more "sources" towed during a survey is greater than the crossline distance between subarray elements within any one of the two or more sources. Another distinction is that separate "sources" as used herein are capable of independent activation, whereas the subarray elements within a single source are typically not capable of independent activation, but rather may only be activated in tandem, responsive to a single source activation signal.

Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and floats 116, such as acoustic transceivers and global positioning system ("GPS") units. Acoustic transceivers and GPS units so disposed help to accurately determine the positions of each subarray 114 during a survey. In some cases, subarrays 114 may be equipped with steering devices to better control their positions during the survey.

Streamers 104 are often very long, on the order of 5 to 10 kilometers, so usually are constructed by coupling numerous shorter streamer sections together. Each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. In various embodiments, streamers 104 need not all have the same length and need not all be towed at the same depth or with the same depth profile. Moreover, prevailing conditions in body of water 106 may cause the depths and lateral positions of streamers 104 to vary at times.

Figure 3:
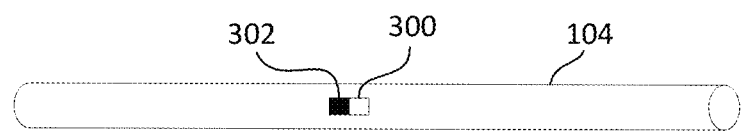
FIG. 3 is a schematic view illustrating a motion sensor collocated with a pressure sensor inside a streamer.
Figure 4:
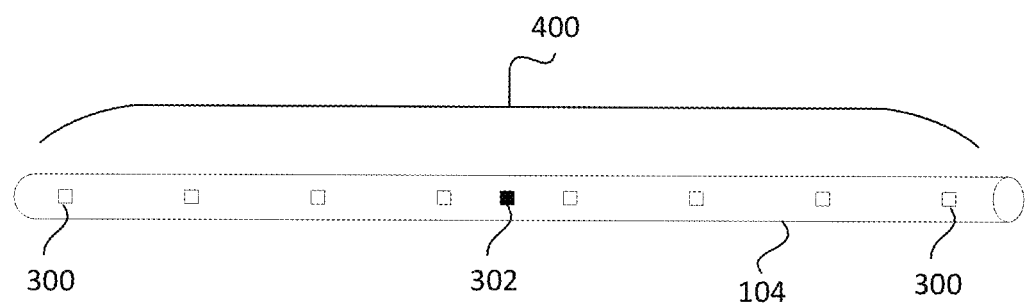
FIG. 4 is a schematic view illustrating a motion sensor collocated with a group of pressure sensors inside a streamer.

Sensors 110 within each streamer 104 may include one or more different sensor types such as pressure sensors (e.g. hydrophones), velocity sensors (e.g. geophones), and acceleration sensors such as micro-electromechanical system ("MEMS") devices. FIGS. 3 and 4 illustrate two example arrangements according to embodiments for disposing sensors 110 in a streamer or cable 104. In both illustrations, pressure sensors are indicated with white squares, while vector sensors such as velocity or acceleration sensors are indicated with shaded squares. In the arrangement of FIG. 3, a pressure sensor 300 is collocated with a vector sensor 302 inside a streamer 104. In the arrangement of FIG. 4, a set of pressure sensors 300 forms a single pressure sensor group 400 inside a streamer 104. A vector sensor 302 is disposed substantially at the center of pressure sensor group 400. Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or vector sensors. Normally, however, only measurements of the same type in a group (e.g. pressure, velocity, or acceleration) would be subject to combination or aggregation. Thus, in the arrangement of FIG. 4, the measurements of pressure sensors 300 may be combined or aggregated into a single signal, while the measurements of vector sensor 302 would be preserved as a separate signal. In other embodiments, streamers may be employed that contain only pressure sensors and no vector sensors.

Repeating a Previous Survey with Asymmetric Quad Sources

The survey layout depicted in FIGS. 1 and 2 may be taken to represent a class of baseline surveys known as "dual source" surveys. In a dual source baseline survey, vessel 102 tows a total of two sources 108 to acquire the survey. Depending on the survey design, the two sources 108 may be activated at the same time or at different times. In general, such a baseline survey may include multiple sail passes. In each sail pass, vessel 102 follows a sail line 134 that defines the sail pass.

An arbitrary Cartesian xyz coordinate system is shown in FIG. 1 for reference. In the illustration, the x direction is shown generally parallel to sail line 134 and is referred to as the "inline" direction. The y direction is orthogonal to the x direction and parallel to the surface of body of water 106. The y direction is generally referred to as the "crossline" direction, as it crosses sail line 134. The z direction points downward from the xy plane toward the subsurface 218 and is generally referred to as the "depth" direction. As can be seen in FIG. 1, the crossline positions of the centers of the two sources 108 define a crossline source spread 136. In the general case for surveys that employ more than two sources, the crossline source spread would correspond to the distance between the centers of the outermost sources in the crossline direction (the "crossline outermost" sources). In the specific case of a dual source survey, the crossline source spread is simply the crossline distance between the centers of the two sources.

Figure 5:
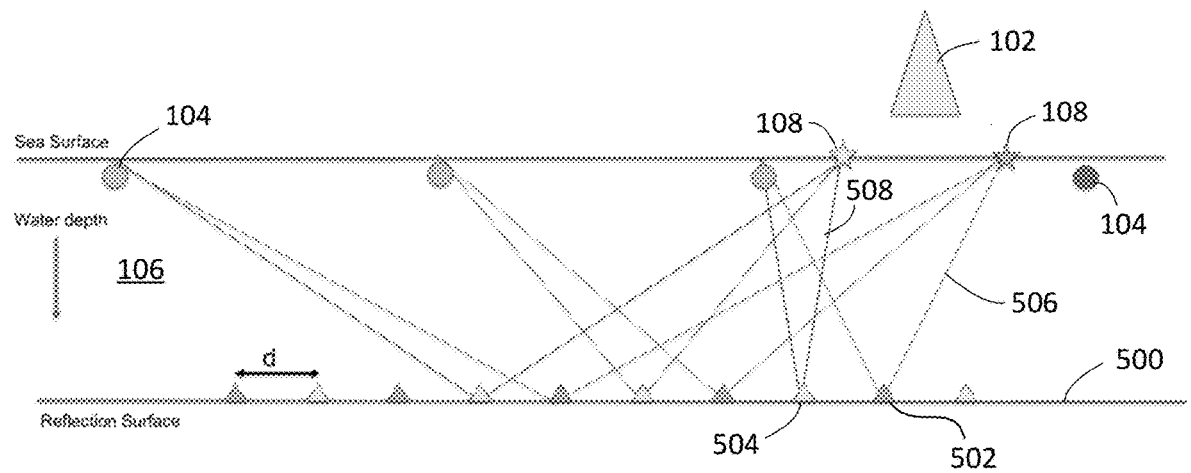
FIG. 5 is a rear view schematically illustrating several aspects of a dual source marine seismic survey.
Figure 8:
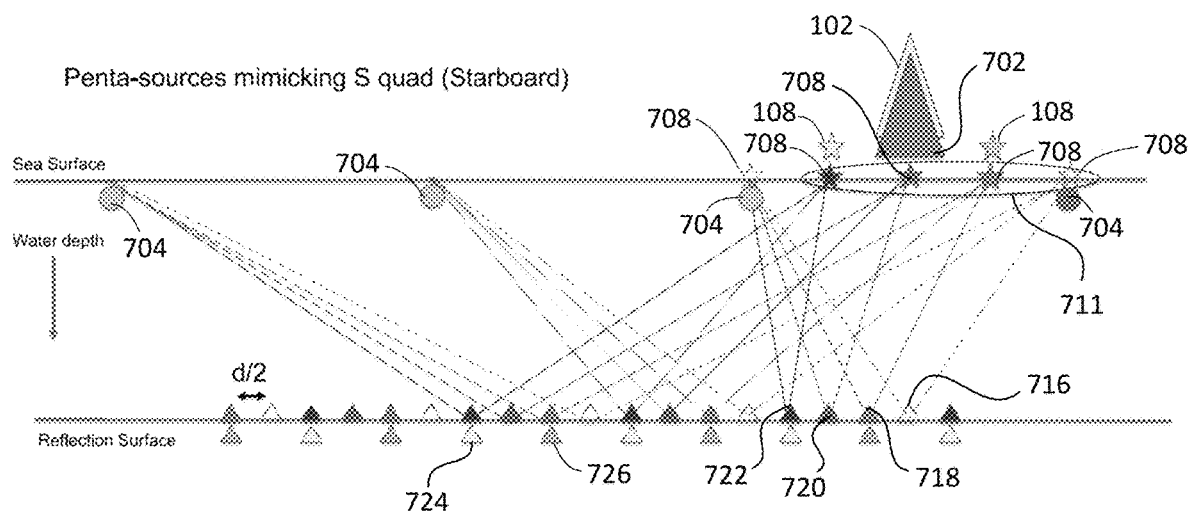
FIGS. 8 and 9 are rear views schematically illustrating several aspects of the monitor survey configuration of FIG. 7.
Figure 9:
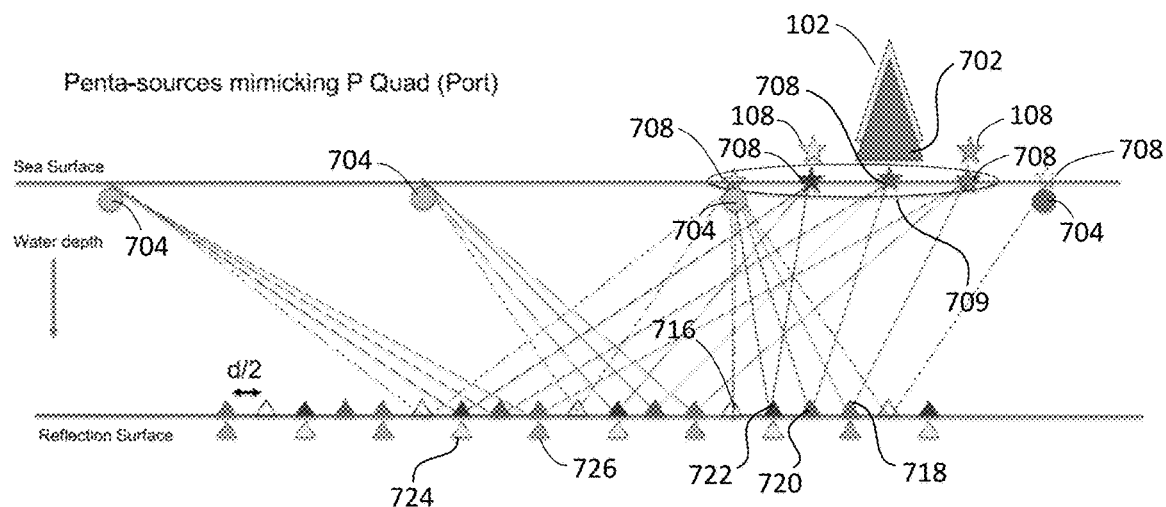
Figure 10:
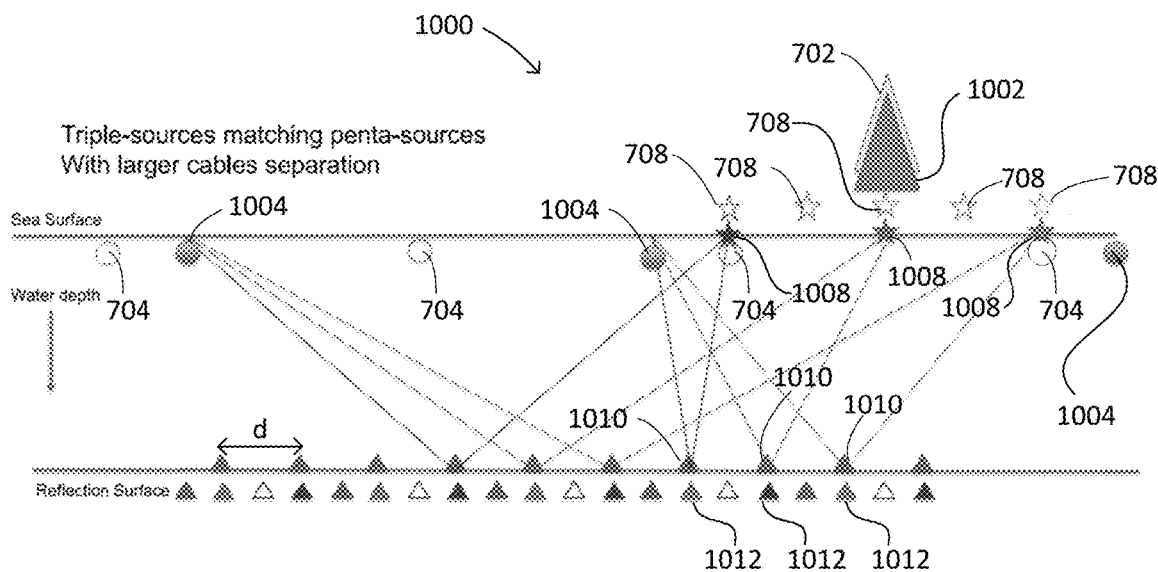
FIG. 10 is a rear view schematically illustrating aspects of a transition from a dual source baseline survey to a triple source monitor survey in accordance with embodiments.

FIG. 5 is a rear view of a dual source configuration. In this drawing, vessel 102 is shown projected 90 degrees out of the xy plane for clarity of illustration. In reality, vessel 102 would be oriented in the xy plane with its stern facing the viewer. Moreover, sources 108 are shown at the surface of body of water 106 for clarity of illustration. In reality, each of sources 108 would normally be towed at a non-zero depth in accordance with various survey requirements, as depicted in FIGS. 1 and 2. FIGS. 8, 9 and 10 make similar simplifications. Also note that, in each of FIGS. 6-10 and 12-14, a monitor survey configuration is shown superimposed over at least one previous survey configuration. This is done only for clarity of discussion and should not be construed to mean either that the monitor survey and previous survey are performed simultaneously, or that they must be or should be performed by the same survey operator.

FIG. 5 illustrates an arbitrary reflection surface 500, which may be located within subsurface 218. Shaded triangles 502 on reflection surface 500 illustrate crossline midpoints between the starboard source 108 and sensor streamers 104. Similarly, white triangles 504 on reflection surface 500 illustrate crossline midpoints between port source 108 and sensor streamers 104. Energy 506 generated by the starboard source 108 is shown being reflected at 502. Energy 508 generated by the port source 108 is shown being reflected at 504. As can be seen in the drawing, the crossline distance between the shaded and the white reflection points defines a crossline bin size d. This crossline bin size corresponds to a crossline resolution that is inherent in the survey design—i.e., in the number of and spacing between the sources, and the number of and spacing between the streamers.

Figure 6:
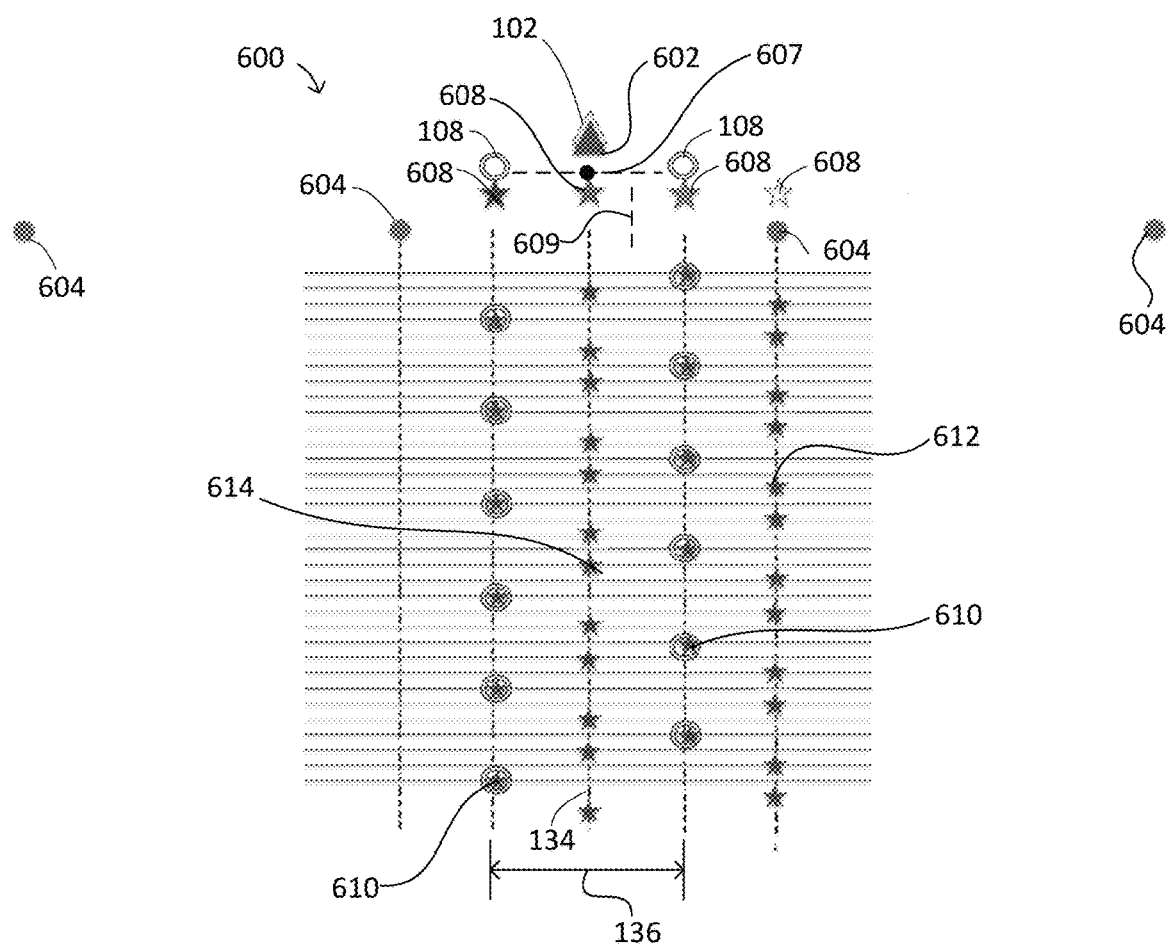
FIG. 6 is a top view of a monitor survey according to embodiments in which a monitor survey vessel tows four sources asymmetrically.

FIG. 6 illustrates a top view of a monitor survey 600 according to embodiments in which monitor survey vessel 602 tows four sources 608 (the "monitor sources") asymmetrically. In these embodiments, sources 608 are towed such that the crossline spacing between them is uniform, but such that their crossline center 609 exhibits a non-zero crossline offset relative either to sail line 134 or to the crossline center 607 of the sources 108 that were used in the previous survey. (In the embodiment shown, the crossline center of sources 108 is aligned with sail line 134. In other embodiments, center 607 may have a non-zero crossline offset relative to sail line 134.) Thus, sources 608 are towed asymmetrically relative either to sail line 134 or to the crossline center 607 of the baseline dual sources 108. The term "asymmetrically" as used herein refers to either configuration. Any suitable towing technique may be employed to tow the four sources in the asymmetrical arrangement shown, such as with the use of conventional source steering devices. The same number of streamers 604 may be towed in the monitor survey as were towed in the baseline survey, and at the same crossline positions. Two of the monitor sources 608 occupy the same crossline positions as did the dual sources 108 of the baseline survey.

Source activation positions ("shot points") from the baseline survey are shown in the drawing as stars inside of circles. The locations of baseline shot points 610 may be obtained from a "post plot" of the baseline survey. A post plot is a data set indicating, among other things, where each source was fired and when during a survey. As can be seen in the illustration, monitor survey 600 repeats shot points 610 that were produced during the baseline survey, and also produces shot points 612, 614 that are additional relative to baseline shot points 610. As used herein, the term "repeated shot points" means shot points that were produced during a previous survey and that are being repeated in a monitor survey. The term "additional shot points" means shot points produced during a monitor survey that were not also produced during a previous survey that is being repeated by the monitor survey.

The additional shot points produced by any one source (or by any one pair of sources) during the monitor survey may occur at a non-constant interval, as depicted in the embodiment of FIG. 6, or they may occur at a constant interval. The choice of the interval or intervals to be used for producing additional shot points may take various factors into consideration such as, for example, air compressor recharge times and capabilities of the source controller hardware to be used during the monitor survey. In some embodiments, a programmable source controller may be used in order to produce non-constant shot point intervals for some or all of the additional shot points.

In embodiments corresponding to FIG. 6, some of the additional shot points (614) are located inside the crossline source spread 136 of the baseline survey, while others of the additional shot points (612) are located outside the crossline source spread 136 of the baseline survey. Among the benefits gained by additional shot points 612, 614 is that the crossline bin size of the monitor survey will be half that of the baseline survey, or d/2. Thus, the monitor survey achieves twice the crossline resolution as does the baseline survey, providing an enhancement in data quality relative to the baseline survey while also faithfully repeating the baseline survey.

In some embodiments, source steering can be employed such that the four monitor sources 608 are towed asymmetrically to the starboard side during one part of a monitor survey, and asymmetrically to the port side during another part of the monitor survey. That is, when towing asymmetrically to the starboard side, the crossline center 609 of the monitor sources would have a crossline offset to the starboard side of either the sail line 134 of the previous survey or the crossline center 607 of the previous survey source spread. When towing asymmetrically to the port side, the crossline center 609 of the monitor sources would have a crossline offset to the port side of either the sail line 134 of the previous survey or the crossline center 607 of the previous survey source spread. In some embodiments, changing between the port and starboard asymmetric configurations during the monitor survey may be performed based on a post plot of the previous survey, such that the configuration chosen at any given time is the one that will require the lesser amount of source steering during a corresponding portion of the monitor survey. In still further embodiments, changing between the two configurations may be performed within a single sail line of the monitor survey.

Repeating a Previous Survey with Symmetric Penta Sources

Figure 7:
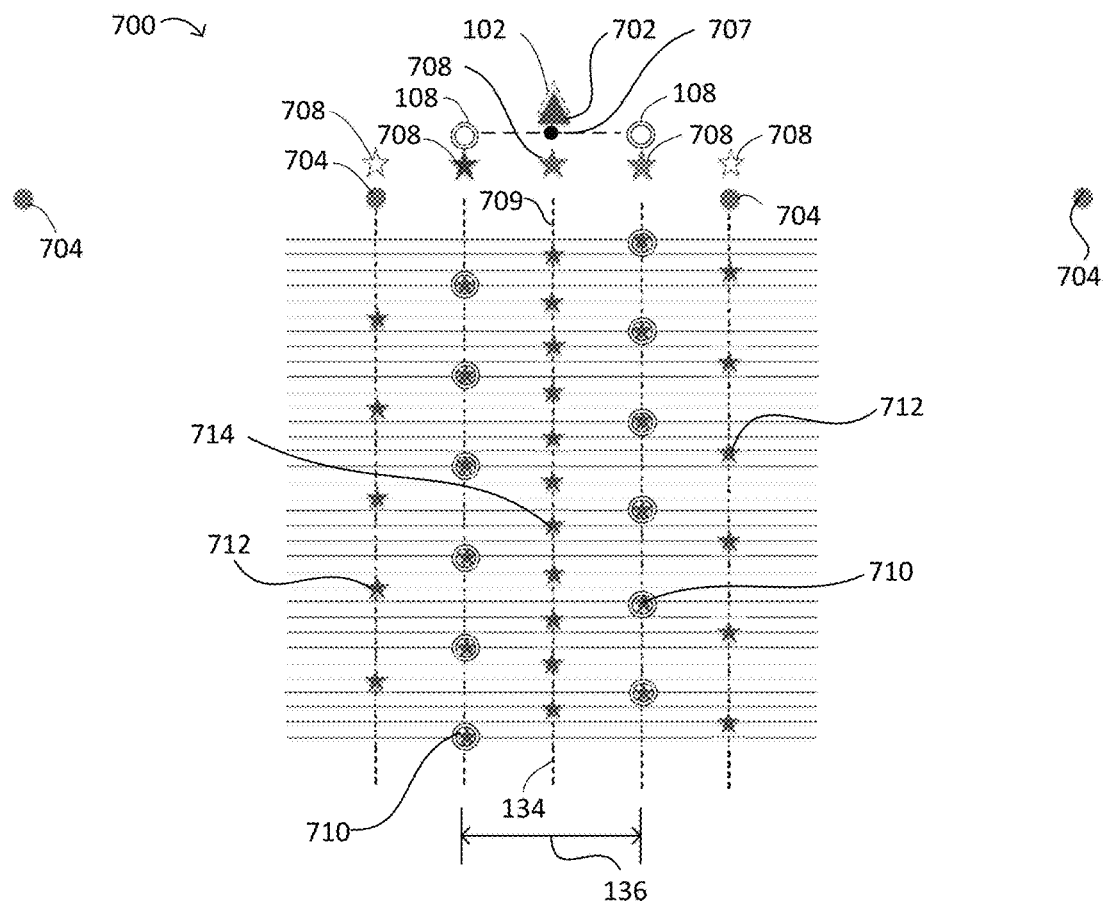
FIG. 7 is a top view of a monitor survey according to embodiments in which a monitor survey vessel tows five sources symmetrically.

FIG. 7 is a top view illustrating a class of embodiments in which a monitor survey 700 employs five monitor sources 708. In the illustration, monitor survey 700 is shown repeating a previous dual source survey, as in the example of FIG. 6. Monitor survey vessel 702 is shown superimposed over previous survey vessel 102. Locations of the sources 108 of the previous survey are shown with circles. In monitor survey 700, monitor vessel 702 tows monitor sources 708 symmetrically. That is, they are towed such that sources 708 have a uniform crossline separation between them and such that their crossline center 709 coincides with either a sail line 134 of the previous survey or with a crossline center 707 of the source spread used during the previous survey. The term "symmetrically" as used herein refers to either configuration. The same number of streamers 704 may be towed in the monitor survey as were towed in the baseline survey, and at the same crossline positions.

Monitor survey 700 produces repeated shot points 710, indicated as stars within circles, and also produces additional shot points 712, 714. Some of the additional shot points (712) are located outside the crossline source spread 136 of the previous survey, while others of the additional shot points (714) are located inside the crossline source spread 136 of the previous survey. As can be seen, the configuration of FIG. 7 achieves the same doubling of crossline resolution as was achieved by the quad-source configuration of FIG. 6. That is, the crossline bin size of the monitor survey, d/2, is half the crossline bin size, d, of the baseline survey.

FIGS. 8 and 9 are rear views illustrating how a symmetric penta-source configuration such as that shown in FIG. 7 may be used in some embodiments to mimic an asymmetric quad-source configuration such as that shown in FIG. 6. The technique shown in FIGS. 8 and 9 provides several benefits. First, it provides the same doubling of crossline resolution (halving the crossline bin size) as do the configurations of FIGS. 6 and 7. Second, the configuration of FIGS. 8 and 9 does not require as much source steering to maintain as does the configuration of FIG. 6. Third, the configuration of FIGS. 8 and 9 produces additional shot points that are both inside and outside the crossline source spread of the previous survey.

In both of FIGS. 8 and 9, subsurface reflection points 716-722 of the monitor survey are shown with triangles having similar shading as corresponding ones of the monitor sources 708. Similarly, subsurface reflection points 724-726 of the previous survey are shown with triangles having similar shading as corresponding ones of the previous survey sources 108. As was the case in FIG. 7, the same number of streamers 704 may be towed in the monitor survey as were towed in the baseline survey, and at the same crossline positions.

During one part of the monitor survey (FIG. 9), the port-most monitor sources, indicated at 709, are activated so as to mimic four sources towed asymmetrically to the port side. During another part of the monitor survey (FIG. 8), the starboard-most monitor sources, indicated at 711, are activated so as to mimic four sources towed asymmetrically to the starboard side. In some embodiments, as in the quad-source configuration of FIG. 6, changing between the port-most and the starboard-most configurations may occur within a single sail line of the previous survey. In additional embodiments, changing between the two configurations may be performed based on a post plot of the previous survey.

Figure 11:
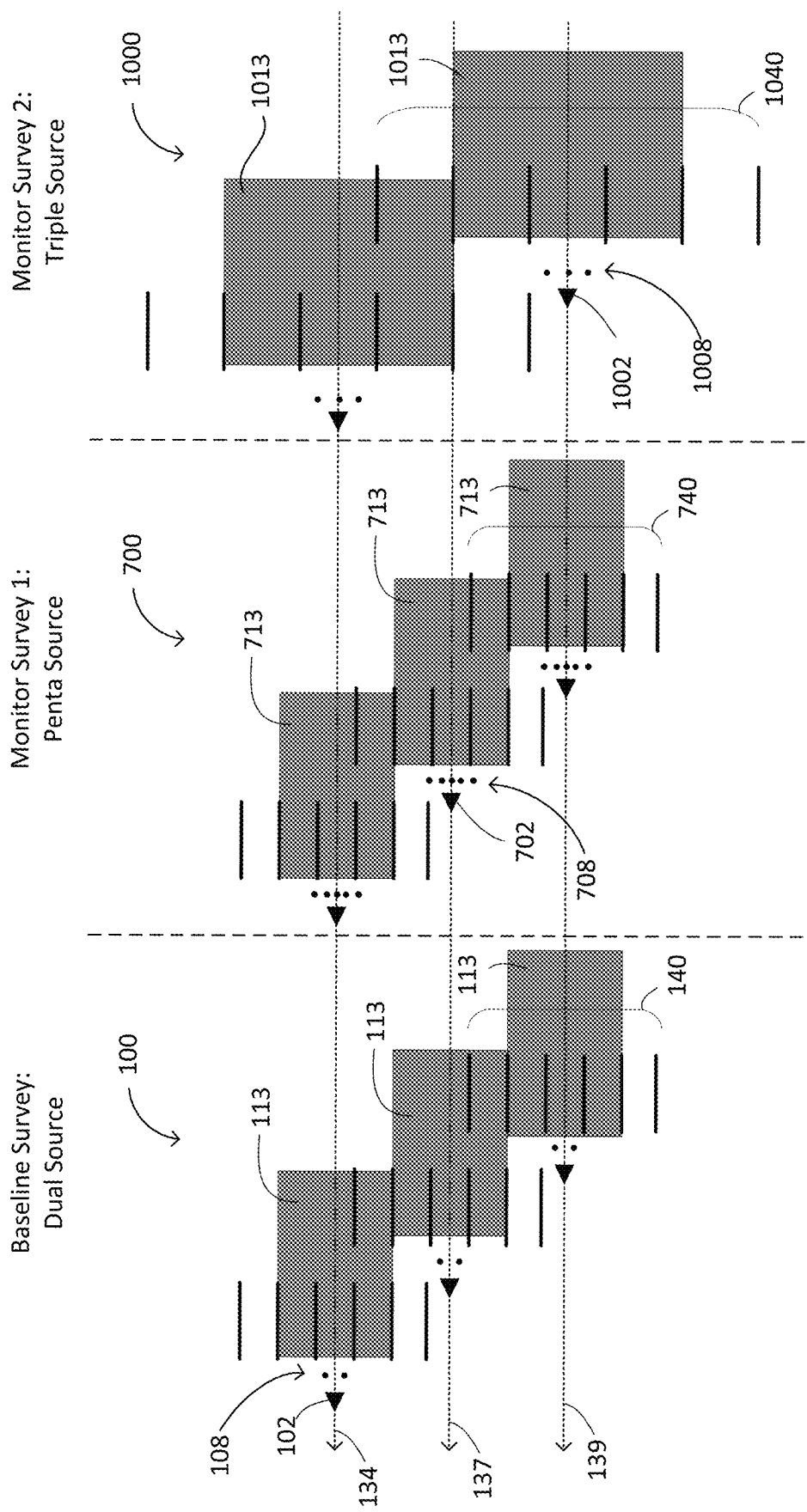
FIG. 11 is a top view illustrating a transition from a dual source baseline survey to a triple source monitor survey in accordance with embodiments.

Transitioning from Dual Source Baseline Surveys to Triple Source Monitor Surveys FIGS. 10 and 11 are rear and top views, respectively, illustrating a class of embodiments in which a transition may be achieved from a dual source baseline survey 100 to a triple source monitor survey 1000.

Referring first to FIG. 11, vessel 102 performs a baseline survey 100 by towing two sources 108 and an array of streamers as shown. The crossline outermost streamers define a streamer spread 140 for the baseline survey. The coverage area achieved by this configuration is indicated generally at 113. Vessel 102 is shown at three different times during the baseline survey, towing the streamer spread first along sail line 134, then along sail line 137, and then along sail line 139. As can be seen, the alignment of the coverage areas 113 yields full coverage over the area being surveyed.

Later in time, vessel 702 performs a monitor survey 700 over the same area by towing five sources 708 and a first monitor survey streamer spread. The crossline outermost streamers in the first monitor survey streamer spread define a streamer spread 740 that is the same as streamer spread 140. As was the case with the baseline survey, vessel 702 follows each of sail lines 134, 137 and 139, and the alignment of coverage areas 713 yields full coverage over the area.

Later still, vessel 1002 performs a second monitor survey 1000 over the area by towing three sources 1008 and a second monitor survey streamer spread. The crossline outermost streamers in the second monitor survey streamer spread define a streamer spread 1040 that is twice the width of streamer spreads 140 and 740. In other embodiments, streamer spread 1040 may be more than twice the width of streamer spreads 140 and 740. For example, the streamer array towed during the second monitor survey may contain more streamers than were used in either of the previous surveys. The configuration of survey 1000 creates a coverage area 1013 that is larger than coverage areas 113 and 713. Thus, vessel 1002 need not follow each of sail lines 134, 137 and 139 to yield full coverage over the survey area. Instead, vessel 1002 need only follow every other one of the sail lines that were followed during the previous surveys. For example, in the drawing, vessel 1002 is shown following only sail lines 134 and 139. As can be seen in the drawing, however, the alignment of coverage areas 1013 during the second monitor survey nevertheless yields full coverage of the area. Because only every other one of the previous survey sail lines must be followed during the second monitor survey, efficiency is gained relative to both of the previous surveys.

At the same time, both data quality and repeatability are preserved. This can be seen more easily with reference to FIG. 10. In FIG. 10, the three sources 1008 of monitor survey 1000 are shown with shaded stars. These sources are shown superimposed over the five sources 708 of monitor survey 700, which are illustrated with white stars. As FIG. 10 illustrates, monitor vessel 1002 tows sources 1008 with uniform crossline separations between them. The three monitor sources 1008 coincide with crossline positions of three of the sources 708 that were used in the previous survey. Specifically, their positions coincide with the crossline outermost sources from the previous survey and with the center source from the previous survey. As FIG. 10 also illustrates, streamers 1004 (shown with shaded circles), may be towed during monitor survey 1000 with greater crossline separation between them relative to the crossline separation of streamers 704 of the previous survey (shown with white circles). In the illustrated embodiment, the total number of monitor streamers 1004 is the same as the total number of streamers 708 and 108 used in the previous surveys. Thus, streamers 1004 may be towed with twice the crossline separation of the previous surveys. In other embodiments, different numbers of streamers and different crossline separations may be used. As was mentioned above, streamer spread 1040 may be designed to be more than twice that of streamer spreads 740 and 140. For example, the number of streamers in streamer spread 1040 may be greater than the number of streamers in either of streamer spreads 740 or 140.

FIG. 10 illustrates how data quality and repeatability are preserved by the second monitor survey. Subsurface reflection points 1010 of monitor survey 1000 coincide with subsurface reflection points 1012 of monitor survey 700. Thus, comparison of results between survey 1000 and survey 700 is meaningful. Moreover, the crossline bin size, d, corresponding to monitor survey 1000 is the same as the crossline bin size, d, of baseline survey 100. Thus, crossline resolution is maintained relative to baseline survey 100. In this manner, a transition can be achieved from a dual source baseline survey to three-source ("triple source") monitor surveys, achieving improvements in survey efficiency while preserving both data quality and repeatability.

Source Pairing for Repeated Shot Points and Additional Shot Points

Figure 12:
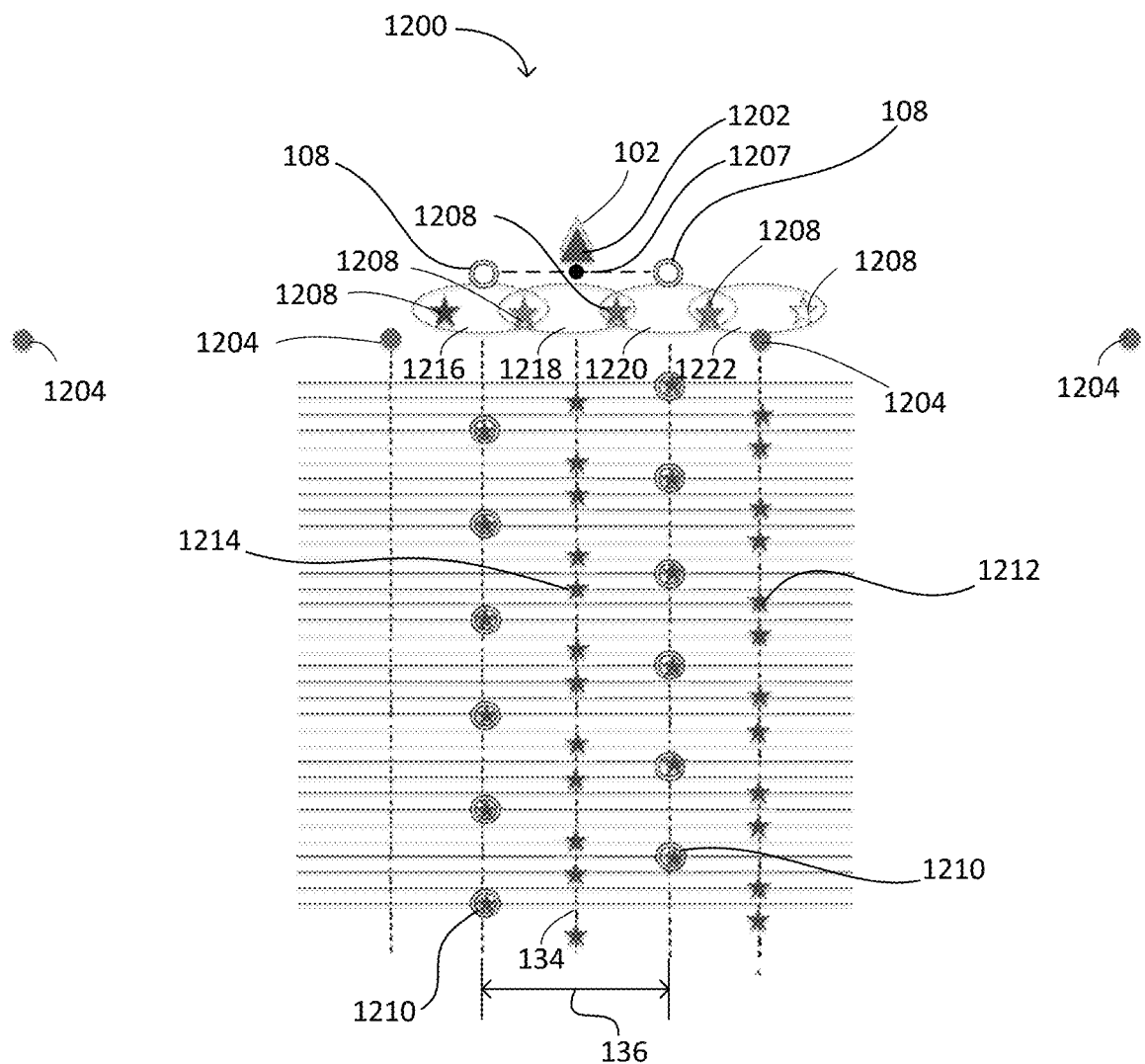
FIGS. 12-14 are top views schematically illustrating a class of monitor survey embodiments in which pairs of sources in the monitor survey are used either to repeat shot points from a previous survey or to provide additional shot points, or both.
Figure 13:
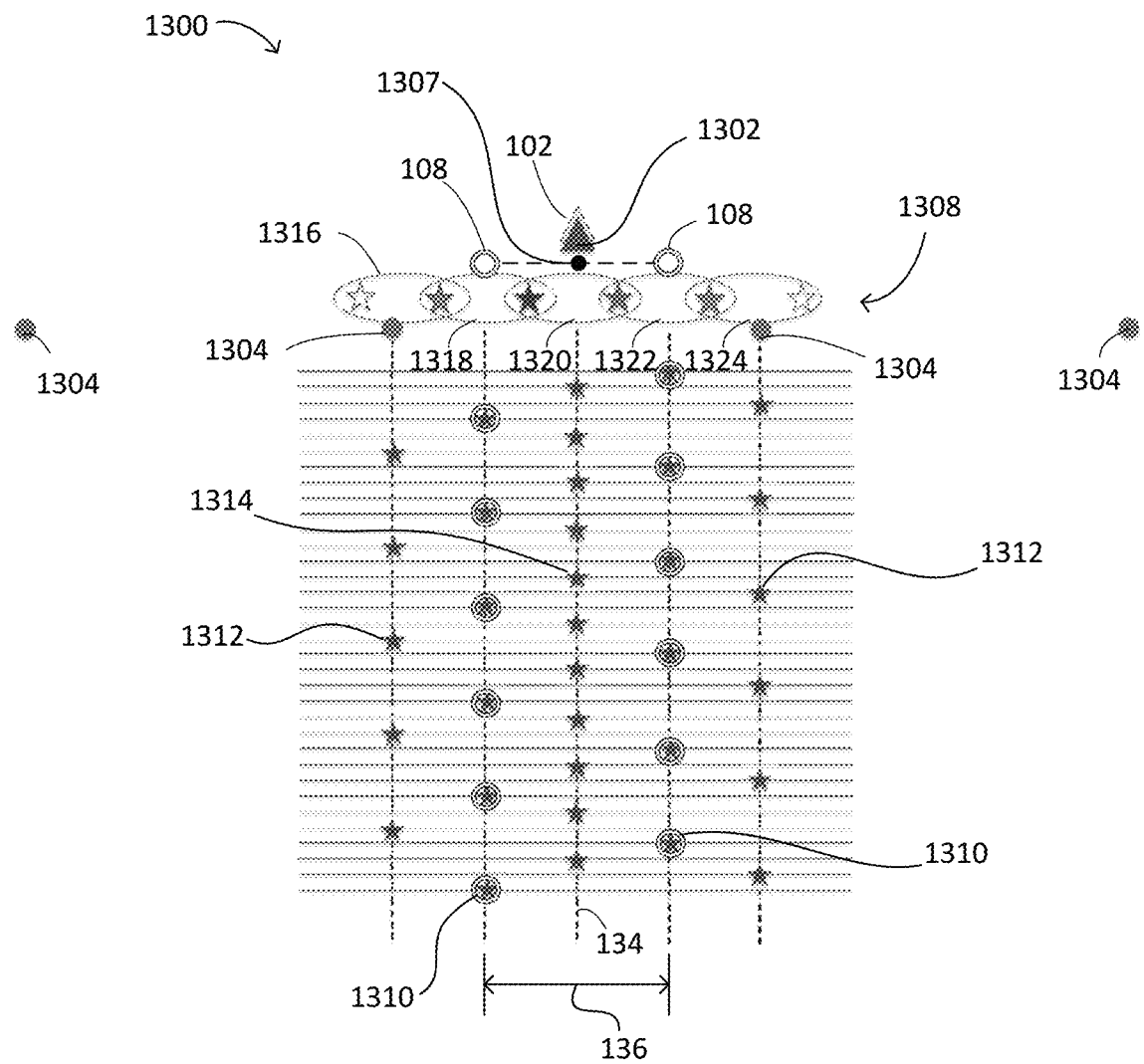
Figure 14:
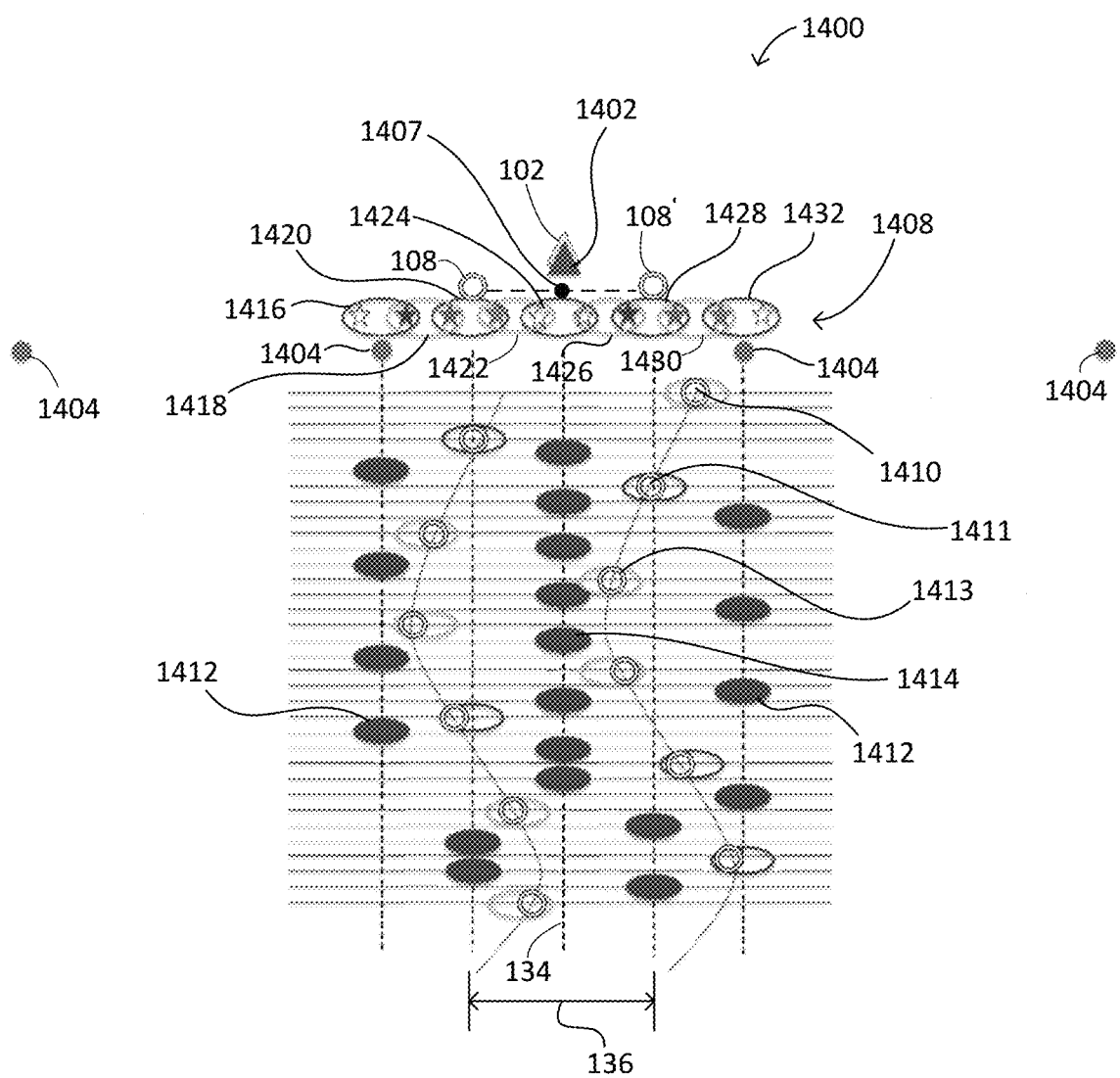

FIGS. 12-14 illustrate a class of embodiments in which pairs of sources in a monitor survey are used either to repeat shot points from a previous survey or to provide additional shot points, or both.

In monitor survey 1200 (FIG. 12), monitor vessel 1202 tows monitor streamers 1204 and five monitor sources 1208 having distinct crossline positions and having uniform crossline separation between them. Monitor sources 1208 are towed asymmetrically. That is, there is a crossline offset between the crossline midpoint of sources 1208 and either sail line 134 or a crossline midpoint 1207 between sources 108 from the previous survey. In all of the embodiments of FIGS. 12-14, paired monitor sources may be activated together or separately. Monitor source pairs 1216 and 1220 are used to repeat shot points 1210 from the previous survey. Monitor source pair 1218 is used to provide additional shot points 1214 located inside the crossline source spread 136 of the previous survey, while monitor source pair 1222 is used to provide additional shot points 1212 located outside the crossline source spread 136 of the previous survey. Moreover, each of monitor sources 1208 may be actuated individually or in other pairings to yield yet further additional shot points (not shown) that were not produced in the previous survey.

In monitor survey 1300 (FIG. 13), monitor vessel 1302 tows monitor streamers 1304 and six monitor sources 1308 having distinct crossline positions and having uniform crossline separation between them. Monitor sources 1308 are towed symmetrically. That is, the crossline midpoint of sources 1308 coincides with either sail line 134 from the previous survey or with a crossline midpoint 1307 between sources 108 from the previous survey. Monitor source pairs 1318 and 1322 are used to repeat shot points 1310 from the previous survey. Monitor source pairs 1316 and 1324 are used to produce additional shot points 1312 located outside the crossline source spread 136 of the previous survey, while source pair 1320 is used to produce additional shot points 1314 located inside the crossline source spread 136 of the previous survey. Moreover, each of monitor sources 1308 may be actuated individually or in other pairings to yield yet further additional shot points (not shown) that were not produced in the previous survey.

In monitor survey 1400 (FIG. 14), monitor vessel 1402 tows monitor streamers 1404 and ten monitor sources 1408 having distinct crossline positions and having uniform crossline separation between them. Monitor sources 1408 are towed symmetrically. That is, the crossline midpoint of sources 1408 coincides with either sail line 134 from the previous survey or with a crossline midpoint 1407 between sources 108 from the previous survey. As in the configurations of FIGS. 12 and 13, some of monitor source pairs 1416-1428 are used to repeat the shot points of the previous survey, while others are used to produce additional shot points 1412, 1414 that are located outside and inside the crossline source spread 136 of the previous survey, respectively, and as shown. In other embodiments, different numbers of source pairs may be used.

In FIG. 14, note that previous survey shot points 1410, 1411 and 1413 were all produced by one previous survey source 108' that was located on the starboard side of vessel 102 during the previous survey. During monitor survey 1400, however, three different monitor source pairs, 1430, 1428 and 1426, are used to repeat shot points 1410, 1411 and 1413, respectively. Each of pairs 1426, 1428 and 1430 represents a subset of monitor sources 1408, but none of the subsets is identical to the other two subsets. Rather, three distinct monitor source subsets are used at different times to repeat shot points that were produced by a single source during the previous survey. Among the benefits achieved by this technique is that source steering may be minimized during monitor survey 1400, even in circumstances where the post plot of the previous survey exhibits crossline variations in shot point locations attributable to one or more of the previous survey sources. A similar technique may be employed in any of the previously described configurations in which three or more sources are used during the monitor survey.

In still other embodiments, source pairs not being used to reproduce shot points from the previous survey may be used to produce additional shot points, and those or other source pairs may be used to mimic the asymmetric quad source arrangement of FIG. 6 according to the techniques described in relation to FIGS. 8 and 9.

Use of Additional Monitor Sources to Enhance Previous Survey Dithering Patterns

Figure 15:
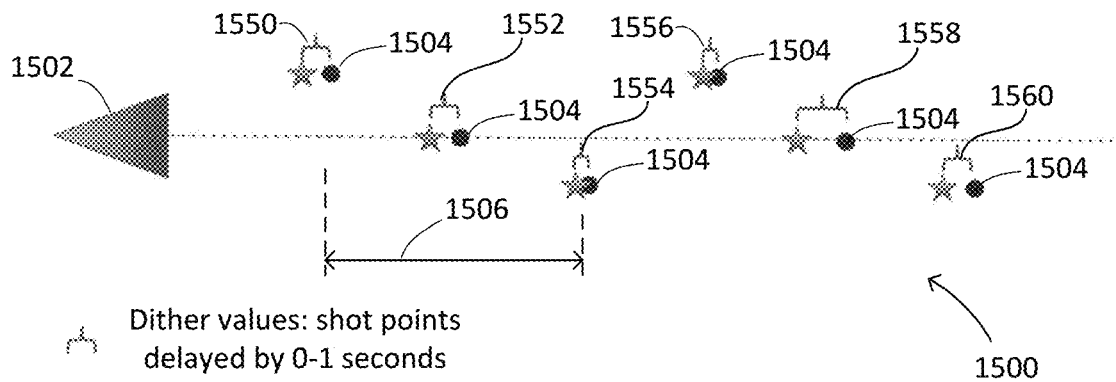
FIG. 15 is a top view schematically illustrating a baseline survey in which source activation dither times are employed.
Figure 16:
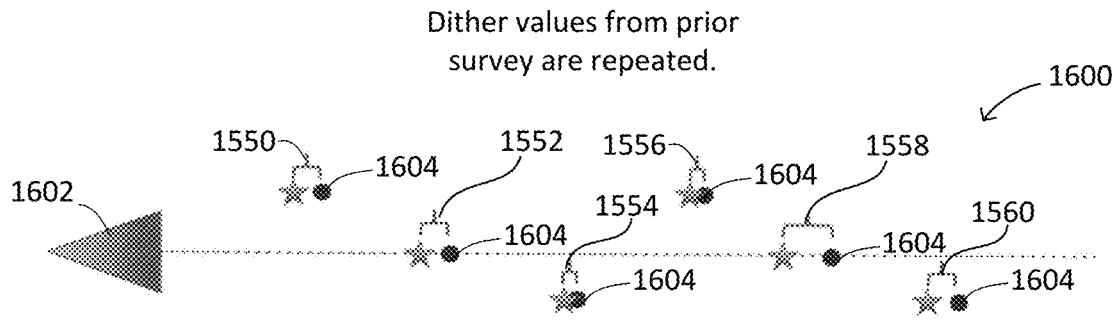
FIG. 16 is a top view schematically illustrating a monitor survey according to embodiments in which source activation dither times from the baseline survey of FIG. 16 are used to repeat the shot points of the baseline survey.
Figure 17:
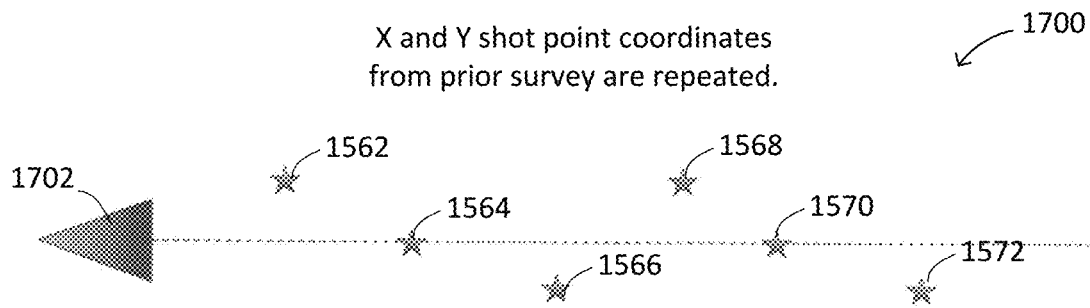
FIG. 17 is a top view schematically illustrating a monitor survey according to embodiments in which shot point locations from the baseline survey of FIG. 16 are used to repeat the shot points of the baseline survey.

FIGS. 15-17 illustrate a class of embodiments in which additional sources provided in a monitor survey may be used to repeat dithered shot points from a previous survey or to provide additional dithered shot points during the monitor survey, or both. The additional shot points may be used to enhance or complement the dithering pattern that was used in the previous survey.

"Dithering" may be understood with reference to FIG. 15, which illustrates a three-source baseline survey 1500. Vessel 1502 tows sources at different crossline positions, as shown. Constant shot point intervals are indicated in the drawing by black-filled circles 1504. One illustrative example of a constant shot point interval would be activating one of the three sources every 12.5 meters. Other examples of constant shot point intervals are also possible. A sequence in which each of the sources is activated once is referred to as an "activation sequence." One such activation sequence is indicated in the drawing at 1506. In each of FIGS. 15-17, source activations are illustrated by shaded stars.

In a dithered survey such as the survey of FIG. 15, rather than activating the sources at regular distances corresponding to a constant shot point interval, vessel 1502 instead activates the sources with varying positive or negative delays 1550-1560 relative to a constant shot point interval. Such delays are known as "dither times" or "dither values" and, collectively, constitute a "dithering pattern." In the embodiment shown, the delays vary in a time range between 0 and 1 seconds. Other delay time ranges are also possible. Dither times typically vary from one activation sequence to another and may do so in a systematic, random or pseudo random manner. Such variations may be artificially introduced by means of manipulating source activation times, or they may be produced in a so-called "natural" manner by relying on variations in the environment in which the survey is being performed, such as varying ocean currents. The variations may also be produced by other influences such as random errors occurring in GPS units that are used during the survey. Regardless of which dithering pattern or dithering method is employed, a post plot of the survey typically captures the actual firing times and locations for each shot point produced.

FIGS. 16 and 17 illustrate two different techniques according to embodiments for repeating a dithered survey such as survey 1500. In monitor surveys 1600 and 1700, any of the source and streamer configurations previously described herein may be employed and, thus, additional sources may be used during the monitor surveys relative to the number of sources that were used in the previous survey. For clarity of illustration, however, not all of the monitor survey sources appear in FIGS. 16 and 17, and only the shot points being repeated by the monitor survey are shown.

In the method of FIG. 16, monitor vessel 1602 activates the monitor survey sources by generating source activation signals at times that are based on the dither times, or the dithering pattern, that was employed during the baseline survey. That is, monitor vessel 1602 repeats the baseline survey shot points by introducing the same delays 1550-1560 in source firing times, relative to regular shot point intervals 1604, as were introduced during the baseline survey.

In the method of FIG. 17, monitor vessel 1702 activates the monitor sources according to shot point locations 1562-1572 that were recorded during the baseline survey. That is, vessel 1702 repeats the baseline survey shot points by following a post plot of shot point positions corresponding to the previous survey and by activating the monitor sources accordingly.

In either of the above two methods, the monitor vessel may also produce additional shot points by using any of the techniques previously described herein. According to embodiments, these additional shot points may be produced at times and/or locations that are calculated to exhibit incoherence compared to relevant ones of the repeated shot points. In this context, relevant ones of the repeated shot points would normally include those whose reflected energy will be recorded simultaneously with reflected energy from a given additional shot point under consideration. For example, relevant ones of the repeated shot points may include shot points that fall within a given activation sequence or shot points that are adjacent to a given activation sequence, or both. The incoherence so introduced may comprise incoherence with respect to time, or with respect to one or more spatial dimensions, or may comprise a combination of these. In this manner, both the repeated shot points and the additional shot points produced during the monitor survey may be efficiently deblended from one another according to known techniques that exploit such incoherency. ("Deblending" refers to known processes for separating, from recorded seismic data, energy that is attributable to an activation of one source during a survey from energy that is attributable to an activation of a different source used during the same survey.)

One method of analyzing and/or planning source activations for the additional shot points is to consider them over a period of time or a unit of distance that is of interest. The period of time or the unit of distance over which the source activations are considered may vary. For example, the period of time or the unit of distance may correspond to one activation sequence of the sources to be used during a survey. As another example, the period of time or the unit of distance may correspond to all source activations that will occur during one full sail line of a survey. Other examples are also possible. In either case, a nominal shot time interval or shot distance interval may be visualized as the center of a horizontal axis that represents time or distance, as appropriate. Each source activation being planned may then be placed on the horizontal axis at an offset that represents a difference between the given source activation time or distance and the nominal source activation time or distance. In embodiments, the timing and/or the spacing of the additional shot points to be produced during a 4D monitor survey may be designed such that the offsets from nominal for all of the source activations that will occur during a period of interest (including both the additional shot points and those being repeated from a prior survey) are substantially evenly distributed. Stated differently, the timing and/or the spacing of the additional shot points to be produced during the 4D monitor survey may be planned so as to avoid clustering of source activation offsets when the planned additional shot points and relevant ones of the previous survey shot points are considered together, and wherein the offsets represent deviations from a nominal source activation interval. In this manner, the dithering pattern used during a monitor survey may enhance or complement the dithering pattern of a survey that is being repeated.

Computer System

Figure 18:
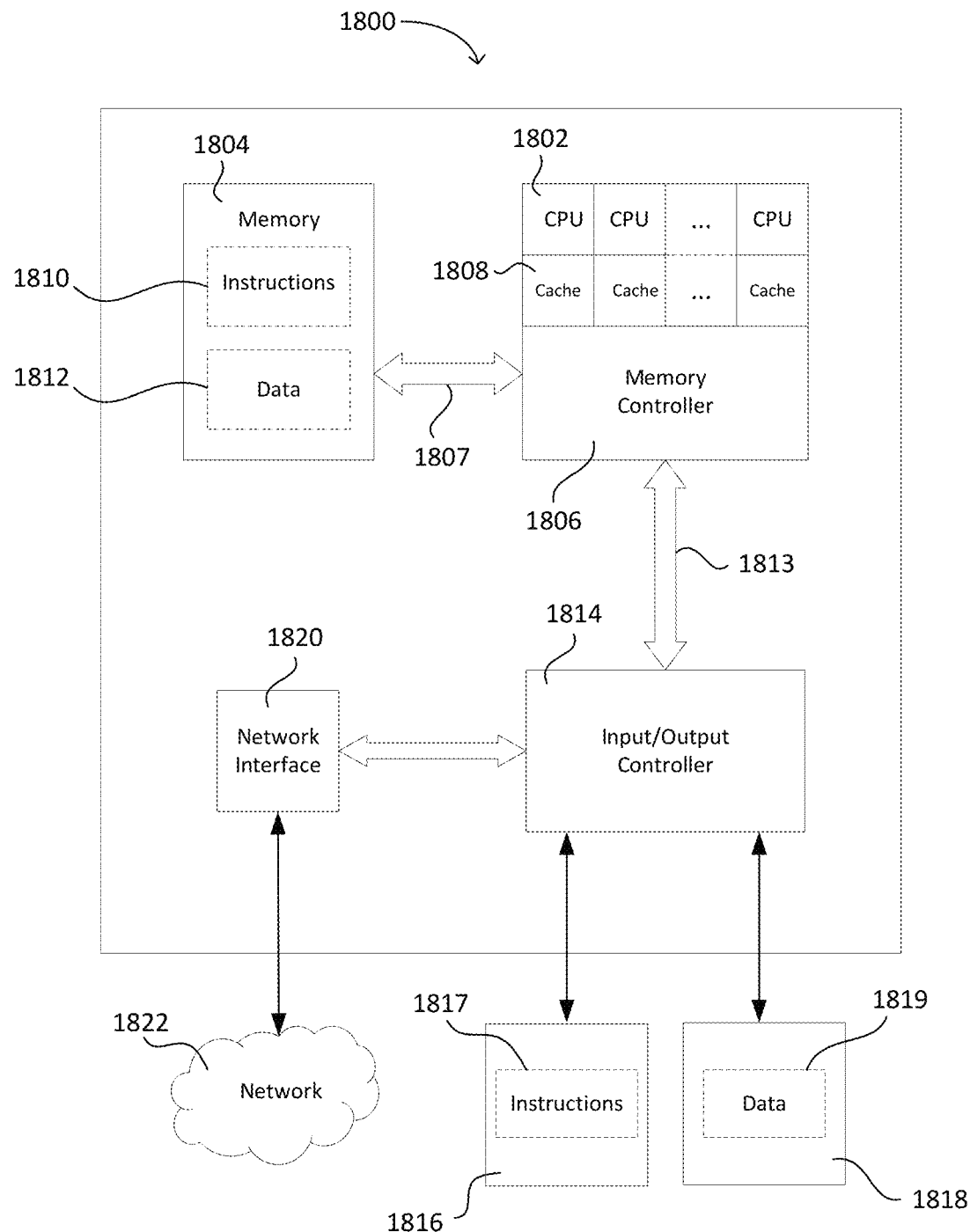
FIG. 18 is a block diagram illustrating an example computer system suitable for use in implementing methods according to embodiments.

FIG. 18 is a block diagram illustrating an example computer system 1800 that may be used to perform any of the methods described above. A computer system such as computer system 1800 may also be used to produce a computer-readable survey plan comprising instructions that, if followed by navigation and control equipment onboard or otherwise associated with a survey vessel, cause the equipment to perform any of the methods described above.

Computer system 1800 includes one or more central processor unit ("CPU") cores 1802 coupled to a system memory 1804 by a high-speed memory controller 1806 and an associated high-speed memory bus 1807. System memory 1804 typically comprises a large array of random-access memory locations, often housed in multiple dynamic random-access memory ("DRAM") devices, which in turn are housed in one or more dual inline memory module ("DIMM") packages. Each CPU core 1802 is associated with one or more levels of high-speed cache memory 1808, as shown. Each core 1802 can execute computer-readable instructions 1810 stored in system memory 1804, and can thereby perform operations on data 1812, also stored in system memory 1804.

Memory controller 1806 is coupled, via input/output bus 1813, to one or more input/output controllers such as input/output controller 1814. Input/output controller 1814 is in turn coupled to one or more tangible, non-volatile, computer readable media such as computer-readable medium 1816 and computer-readable medium 1818. Non-limiting examples of such computer-readable media include so-called solid-state disks ("SSDs"), spinning-media magnetic disks, optical disks, flash drives, magnetic tape, and the like. Media 1816, 1818 may be permanently attached to computer system 1800 or may be removable and portable. In the example shown, medium 1816 has instructions 1817 (software) stored therein, while medium 1818 has data 1819 stored therein. Operating system software executing on computer system 1800 may be employed to enable a variety of functions, including transfer of instructions 1810, 1817 and data 1812, 1819 back and forth between media 1816, 1818 and system memory 1804.

Computer system 1800 may represent a single, stand-alone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 1800 may represent an access point from which such a cluster or multi-computer system may be accessed and/or controlled. Any of these or their components or variants may be referred to herein as "computing apparatus" or a "computing device."

Instructions 1817 may correspond to algorithms for performing any of the methods described herein or for producing a computer-readable survey plan for implementing one or more of such methods. In such embodiments, instructions 1817, when executed by one or more computing devices such as one or more of CPU cores 1802, cause the computing device to perform methods described herein, or to perform operations described herein on data 1819, producing results that may be stored in one or more tangible, non-volatile, computer-readable media such as medium 1818. In some embodiments, data 1819 may correspond to marine seismic sensor measurements or other signals recorded during a marine geophysical survey performed according to methods described herein or may correspond to a survey plan for implementing any of the methods described herein.

In such embodiments, medium 1818 constitutes a geophysical data product that is manufactured by using the computing device to perform methods described herein and by storing the results in the medium. Geophysical data product 1818 may be stored locally or may be transported to other locations where further processing and analysis of its contents may be performed. If desired, a computer system such as computer system 1800 may be employed to transmit the geophysical data product electronically to other locations via a network interface 1820 and a network 1822 (e.g. the Internet). Upon receipt of the transmission, another geophysical data product may be manufactured at the receiving location by storing contents of the transmission, or processed versions thereof, in another tangible, non-volatile, computer readable medium. Similarly, geophysical data product 1818 may be manufactured by using a local computer system 1800 to access one or more remotely-located computing devices in order to execute instructions 1817 remotely, and then to store results from the computations on a medium 1818 that is attached either to the local computer or to one of the remote computers. The word "medium" as used herein should be construed to include one or more of such media.

In any of the above-described embodiments, such a computing device may be used to generate first and second distinct data sets to represent results of a 4D monitor survey. The first data set may correspond just to the set of repeated shot points that were performed during the 4D monitor survey, such that each of the shot points in the first data set corresponds to a shot point from the previous survey. The second data set may include both the set of repeated shot points and the set of additional shot points that were produced during the 4D monitor survey.

CONCLUSION

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. A method of performing a marine seismic 4D monitor survey that repeats a previous survey, comprising:
    towing a number of sources during the marine seismic 4D monitor survey that is greater than a number of sources that were used to perform the previous survey, such that the marine seismic 4D monitor survey employs additional sources relative to the number of sources that were used to perform the previous survey; and
    activating the additional sources during the marine seismic 4D monitor survey to produce additional shot points relative to shot points that were produced during the previous survey;
    wherein crossline outermost sources that were used to perform the previous survey define a previous survey crossline source spread; and
    wherein some of the additional shot points are produced at crossline positions outside the previous survey crossline source spread and others of the additional shot points are produced at crossline positions inside the previous survey crossline source spread.

2. The method of claim 1, wherein at least a first shot point and a second shot point were produced by one source during a single sail pass of the previous survey, and wherein the method further comprises:
    towing three or more 4D monitor sources during the marine seismic 4D monitor survey such that each 4D monitor source occupies a distinct crossline position;
    activating a first subset of the 4D monitor sources to repeat the first shot point; and
    activating a second subset of the 4D monitor sources to repeat the second shot point;
    wherein the first subset and the second subset are not identical.

3. The method of claim 1:
    wherein the marine seismic 4D monitor survey is performed using five sources that are towed symmetrically relative to sail lines of the previous survey but that are activated in a manner that mimics four sources towed asymmetrically relative to the sail lines of the previous survey.

4. The method of claim 1:
    wherein the marine seismic 4D monitor survey employs six sources.

5. The method of claim 1:
    wherein pairs of sources in 4D monitor source array are used to repeat single shot points corresponding to the previous survey.

6. The method of claim 3:
    wherein, during a first part of the marine seismic 4D monitor survey, a port-most source configuration is employed such that port-most four sources are used to mimic the four sources towed asymmetrically, and, during a second part of the marine seismic 4D monitor survey, a starboard-most source configuration is employed such that starboard-most four sources are used to mimic the four sources towed asymmetrically.

7. The method of claim 6:
    wherein changing between the port-most source configuration and the starboard-most source configuration during the marine seismic 4D monitor survey is based at least in part on a post-plot of shot point locations corresponding to the previous survey.

8. The method of claim 6:
    wherein at least one change between the port-most source configuration and the starboard-most source configuration during the marine seismic 4D monitor survey occurs within a single sail pass of the marine seismic 4D monitor survey.

9. The method of claim 1:
    wherein the marine seismic 4D monitor survey employs ten sources.

10. A method of performing a marine seismic 4D monitor survey that repeats a previous survey, wherein at least a first shot point and a second shot point were produced by one source during a single sail pass of the previous survey, the method comprising:
    towing three or more 4D monitor sources during the marine seismic 4D monitor survey such that each 4D monitor source occupies a distinct crossline position;
    activating a first subset of the three or more 4D monitor sources to repeat the first shot point; and
    activating a second subset of the three or more 4D monitor sources to repeat the second shot point;
    wherein the first subset and the second subset are not identical.

11. The method of claim 10:
    wherein pairs of sources in a 4D monitor source array are used to repeat single shot points corresponding to the previous survey.

12. The method of claim 10:
    wherein the marine seismic 4D monitor survey employs ten sources.

* * * * *